US007926451B2

United States Patent
Foster

(10) Patent No.: US 7,926,451 B2
(45) Date of Patent: Apr. 19, 2011

(54) DUAL PET LEASH

(75) Inventor: Stephen M. Foster, Drexel Hill, PA (US)

(73) Assignees: Stephen M. Foster, Drexel Hill, PA (US), part interest; Steven M. Kaitz, New York, NY (US), part interest (*) Notice: Subject to any disclaimer, the term of this patent is extended or adjusted under 35 U.S.C. 154(b) by 341 days.

(21) Appl. No.: 11/983,804

(22) Filed: Nov. 13, 2007

(65) Prior Publication Data
US 2009/0120376 A1    May 14, 2009

(51) Int. Cl.
*A01K 27/00* (2006.01)

(52) U.S. Cl. .................. 119/795; 119/787; 119/796

(58) Field of Classification Search .............. 119/795, 119/787, 786, 791, 792, 794, 796, 856, 857
See application file for complete search history.

(56) References Cited

U.S. PATENT DOCUMENTS

| 2,776,644 | A | * | 1/1957 | Fontaine | 119/796 |
| 3,964,441 | A | * | 6/1976 | Wall | 119/796 |
| 5,852,988 | A | * | 12/1998 | Gish | 119/795 |
| 5,901,668 | A | * | 5/1999 | Goodger, Sr. | 119/795 |
| 6,273,029 | B1 | * | 8/2001 | Gish | 119/792 |
| 2007/0215065 | A1 | * | 9/2007 | Furlich | 119/795 |
| 2009/0178627 | A1 | * | 7/2009 | Bentz et al. | 119/796 |

* cited by examiner

*Primary Examiner* — Yvonne R. Abbott
(74) *Attorney, Agent, or Firm* — Levisohn Berger LLP

(57) ABSTRACT

The present invention is directed to a dual pet leash, including a spherical-shaped or ellipsoid-shaped or cone-shaped or cylindrical-shaped or egg-shaped detangling element, a handle located adjacent the detangling element, and two or more pet attachment portions or straps extending from the detangling element, the pet attachment portions spaced approximately equidistant from each other, or spaced on approximately opposite sides of the detangling element. Latches for attaching to the pet attachment portions to a pet's collar or pet's harness are also provided.

9 Claims, 9 Drawing Sheets

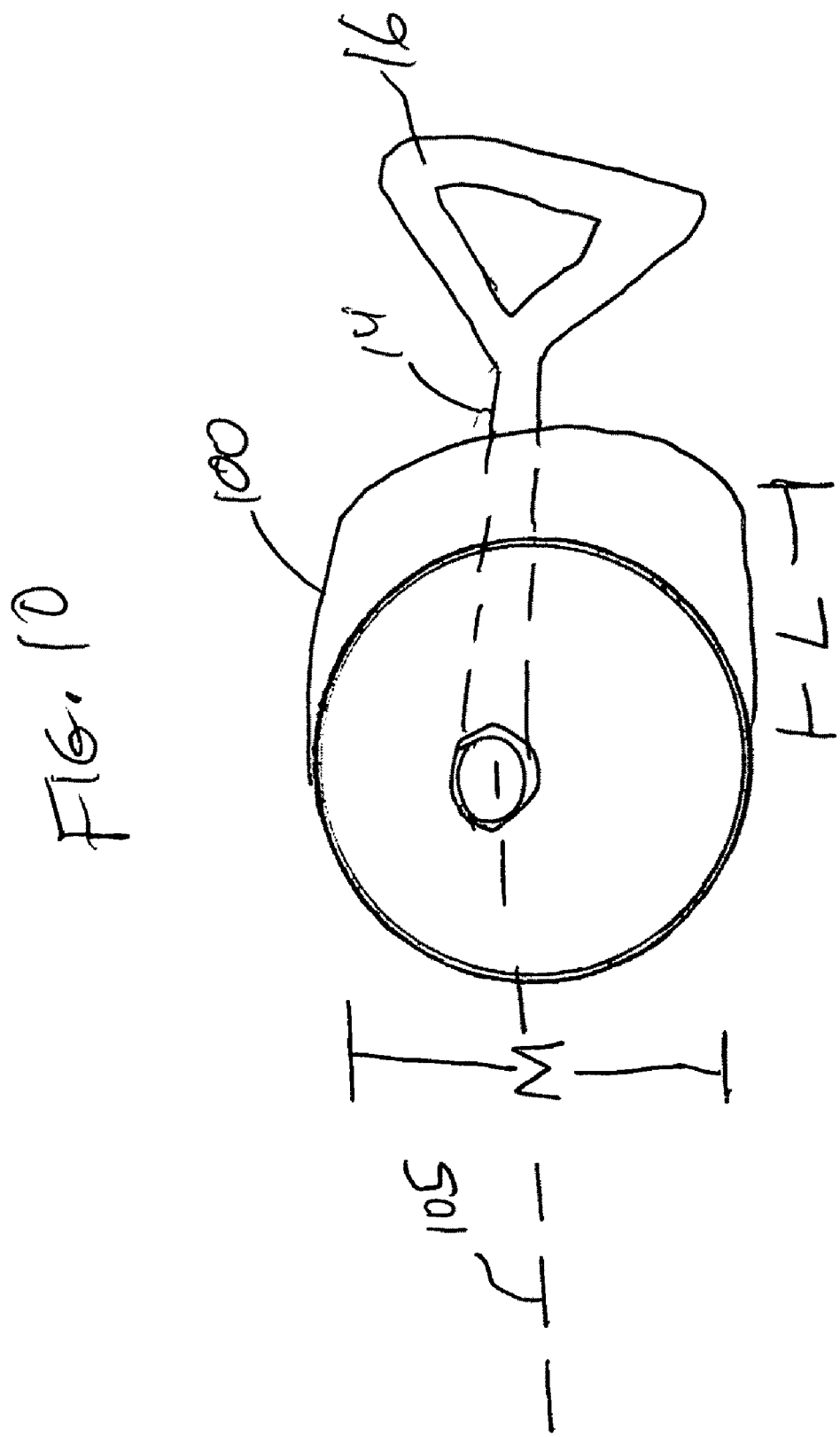

DUAL PET LEASH

FIELD OF INVENTION

This invention relates to the field of pet leashes, and more particularly, to pet leashes for securing a plurality of animals with a means for preventing tangling.

BACKGROUND

It is often common for pet owners to have more than one pet. In particular, pet owners often walk two dogs at one time. Professional dog walkers are also forced to walk multiple pets at one time. In walking multiple pets, there are generally two options. The first is to use multiple pet leashes, which necessarily results in the pets crossing, and tangling the leashes, forcing the person walking the pets (referred to herein as the "pet walker" or "user") to quickly switch hands to avoid tangles, or perform other physical gymnastics to untangle the leash or leashes.

Certain pet leashes have previously been made available, which are inadequate to the task. These involve complicated hinge systems that are still susceptible to tangling, and cannot easily detangle.

Accordingly, there is a need for a simple, efficient, and inexpensive to produce dual pet leash that prevents tangling when pets attached to the leash change position.

SUMMARY

The present invention is directed to a dual pet leash, including a spherical-shaped or ellipsoid-shaped or cone-shaped or cylindrical-shaped or egg-shaped detangling element, a handle located adjacent the detangling element, and two or more pet attachment portions or straps extending from the detangling element, the pet attachment portions spaced approximately equidistant from each other, or spaced on approximately opposite sides of the detangling element. Latches for attaching to the pet attachment portions to a pet's collar or pet's harness are also provided.

BRIEF DESCRIPTION OF THE DRAWINGS

FIG. 10 is a perspective view of another embodiment of a leash for use with multiple pets with detangling element according to the present invention, with portions shown in phantom.

DETAILED DESCRIPTION OF THE PREFERRED EMBODIMENT(S)

Figure 1:
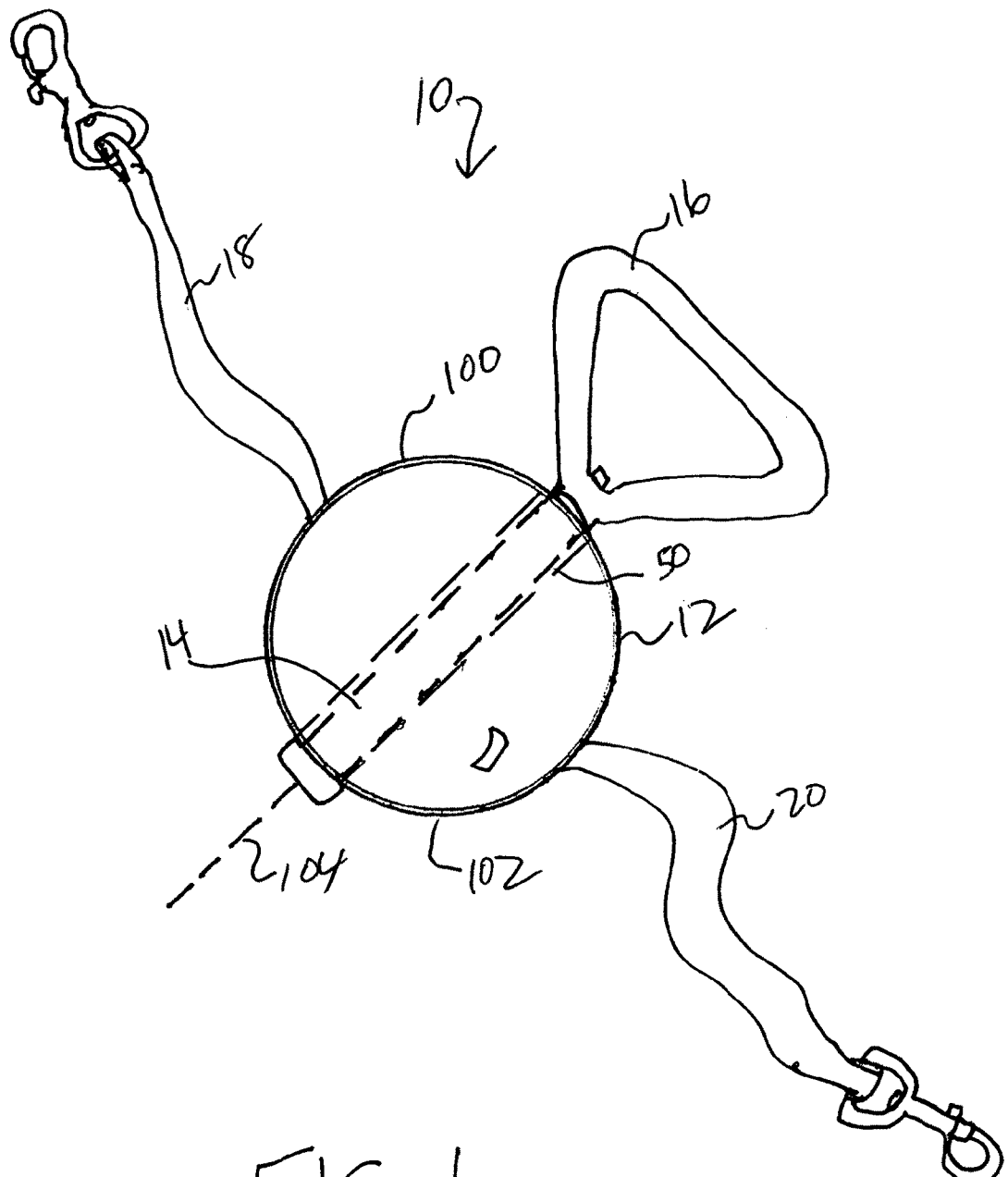
FIG. 1 is a perspective view of an embodiment of a leash for use with multiple pets with detangling element according to the present invention, with portions shown in partial cross-section and phantom.

A pet leash 10 according to the present invention includes a leash detangling element 100, a bolt 14 (post) extending through the leash detangling element 100, a handle portion 16, a first pet attachment portion 18 or strap, and a second pet attachment portion 20 or strap.

Figure 2:
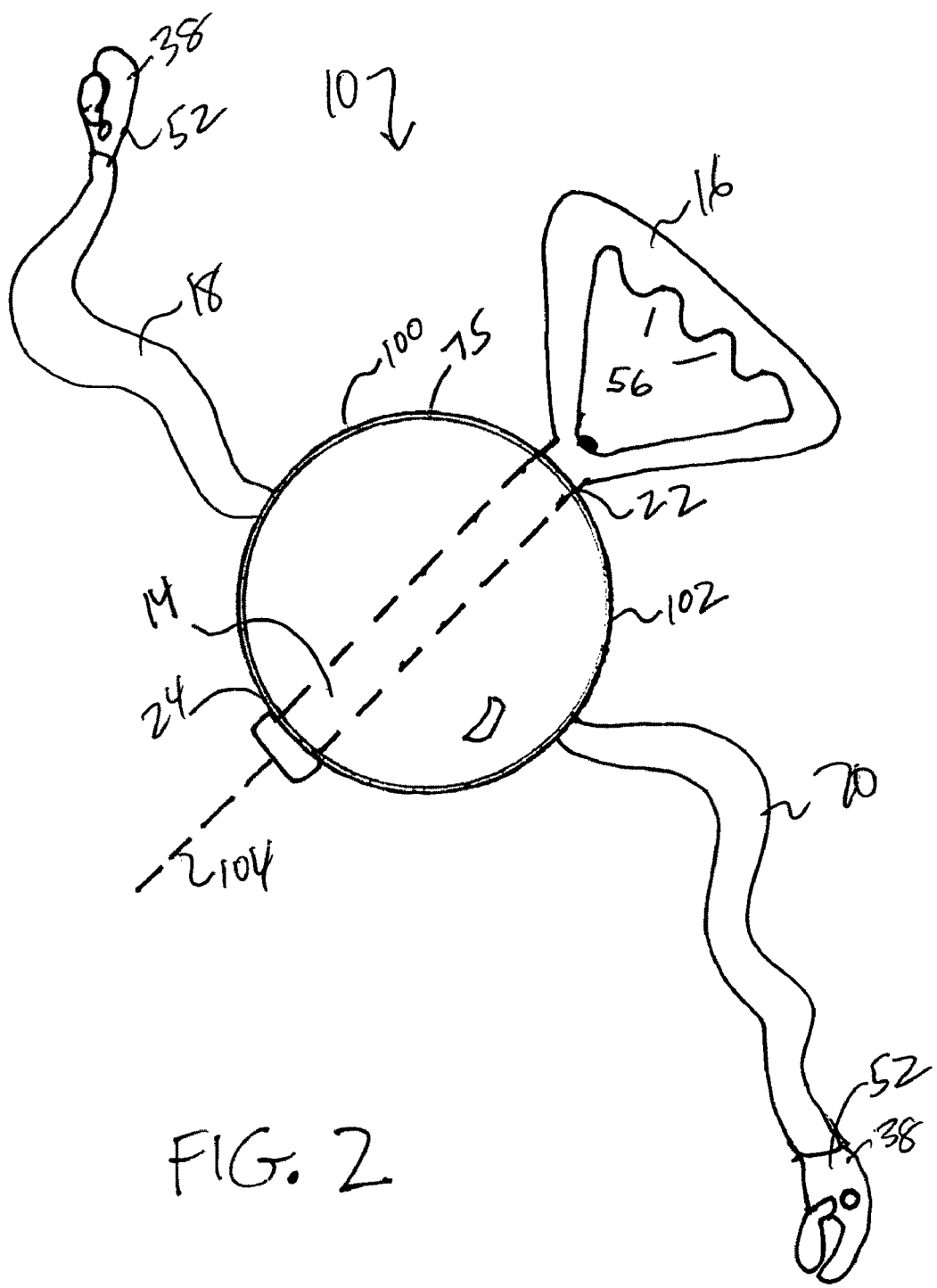
FIG. 2 is a perspective view of another embodiment of a leash for use with multiple pets with detangling element according to the present invention, with portions shown in partial cross-section and phantom.

As shown in FIG. 1, the leash detangling element 100 is preferably an object having a generally ellipsoid-shape (e.g., a spheroid shape, a sphere shape, oblate spheroid shape, prolate spheroid shape, scalene ellipsoid shape, or a generally three-dimensional "egg shape") or a generally cylindrical shape, having a bore or passage 50 therethrough, and a rounded or curved surface 102 or wall. The rounded or curved surface 102 preferably extends generally about the central axis 104 of the leash detangling element 100, as shown in FIGS. 1 and 2. The detangling element 100 is preferably formed from plastic, and may be solid or hollow. The detangling element 100 can also be formed from wood, metal, or any other material or combination of materials. The detangling element 100 may be formed from any substantially rigid material, such as a hard rubber, silicone, a metal, or any material equivalent to any of those, or combinations thereof.

In one embodiment, shown in FIG. 1, the leash 10 of the present invention includes the leash detangling element 100 as a sphere-shaped element 12 (referred to herein as a "sphere," and which may be e.g. a ball, globe or other generally spherical object), with a bolt 14 (post) extending through a passage in 50 the sphere 12, a handle portion 16, a first pet attachment portion 18 or strap or leash, and a second pet attachment portion 20 or strap or leash. In a preferred embodiment, the passage 50 extends through the opposite poles of the sphere (through the sphere's axis 104), forming a central passage 50 preferably down the approximate middle of the sphere 12. The leash attachment element 100 is described in detail herein using an example of a sphere 12; however, it is to be understood that the sphere is an example of a spheroid-shaped or ellipsoid-shaped element, and any element or article having those general shapes may be substituted for the embodiment using a sphere as described herein.

The sphere 12 is preferably formed from hard plastic, but may be formed from any substantially rigid material, such as a hard rubber, silicone, a metal, or any material equivalent to any of those, or combinations thereof. The sphere 12 may be solid as shown in FIG. 1, or hollow, as shown in FIG. 2. If the sphere 12 is hollow, as shown in FIG. 2, the sphere 12 has a wall 75 and included a first opening 22 and a second opening 24 opposite the first opening 22. If the sphere 12 is a solid, the central passage 50 is formed as a bore through the center of the sphere 12, as shown in FIG. 1. The first opening 22 and a second opening 24 and the central passage 50 are configured to receive a bolt 14 therethrough, described in greater detail below.

The sphere 12 may be formed from a single piece of molded material, or may be formed as two hemispheres that are bonded together during the construction of the present invention, as is well known in the art. The sphere 12 may be molded, cast, blow molded, injection molded, carved, or otherwise manufactured or formed. It is appreciated that an object such as a tennis ball, softball, baseball, or other play ball could be used to form the sphere 12 of the present invention. The sphere 12 should preferably be of a light weight so that it can be carried by a pet owner, as with any known leash system.

Figure 3:
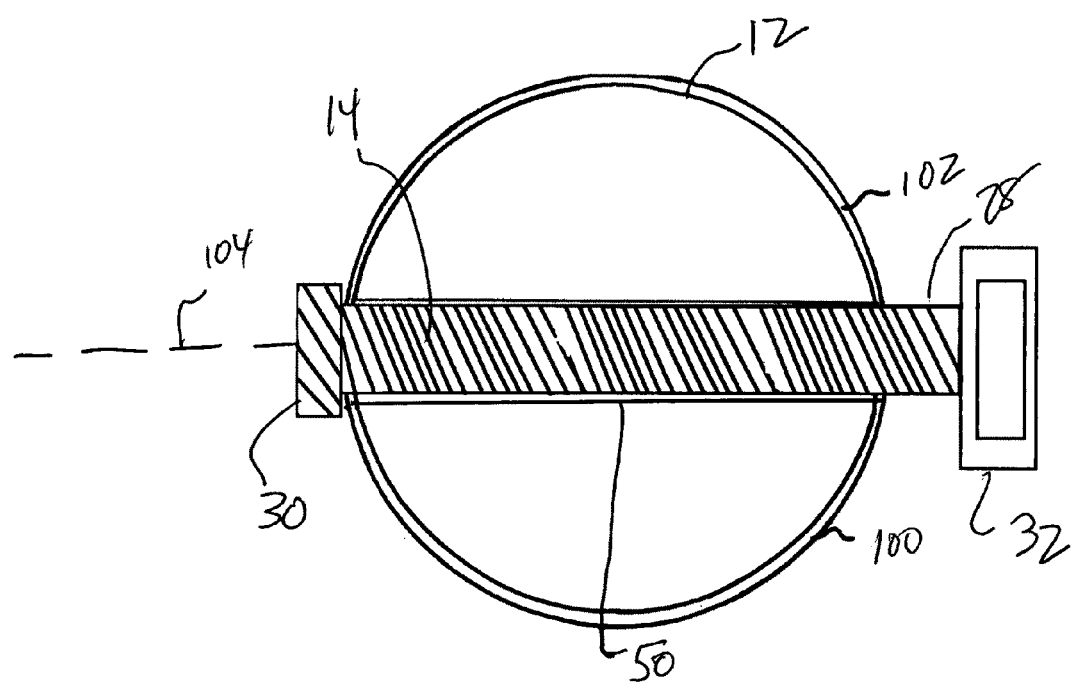
FIG. 3 is a cross section view of an embodiment of a detangling element according to the present invention.

A bolt 14 extends through the passage 50 or the openings 22,24. The bolt 14 includes a first end 28 adjacent a handle portion 16, and a second end 30 opposite the handle portion 16. As shown in FIG. 3, the first end 28 of the bolt 14 may be provided with an engaging portion 32 for engaging the handle portion 16. The engaging portion 32 may be an opening, pin, post, a clip, strap, hook-and-loop fastener arrangement, or any other arrangement for providing a connection between the handle portion 16 and the first end 28 of the bolt 14. The second end 30 of the bolt 14 is preferably sized to be larger than the diameter of the second opening 24 or central passage 50 in the sphere 12. It is appreciated that the handle portion 16 and bolt 14 may be formed as a singled piece, such as shown in FIG. 2. The sphere 12 is configured to rotate freely about the bolt 14, and around the axis 104 running along the longitudinal axis of the bolt 14.

Figure 4:
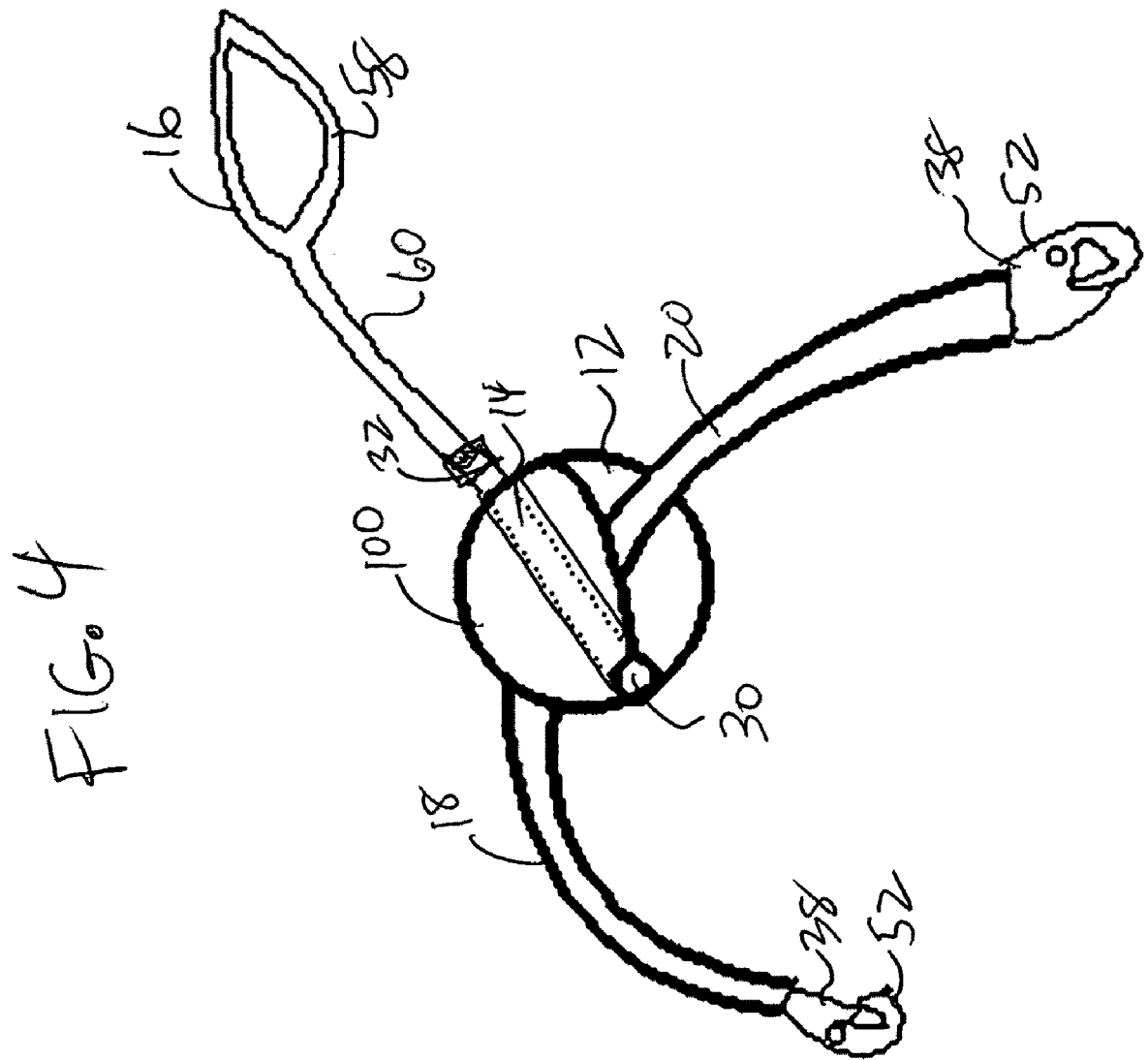
FIG. 4 is a perspective view of another embodiment of a leash for use with multiple pets with detangling element according to the present invention, with portions shown in phantom.

The handle portion 16 may be a plastic handle, and may include finger grooves 56 as shown in FIG. 2 for comfort in gripping the handle portion 16. The handle portion 16 may also be a strap 58 as shown in FIG. 4. The handle portion 16 may be attached to the bolt 14 in any acceptable manner, such as with a pin, bolt, adhesive, or other attachment means. The handle portion 16 may be formed to move independently of or in conjunction with the bolt 14. The handle portion 16 preferably rotates independently of the sphere 12. In a preferred embodiment, the handle portion 16 and bolt 14 are formed to move together.

Figure 5:
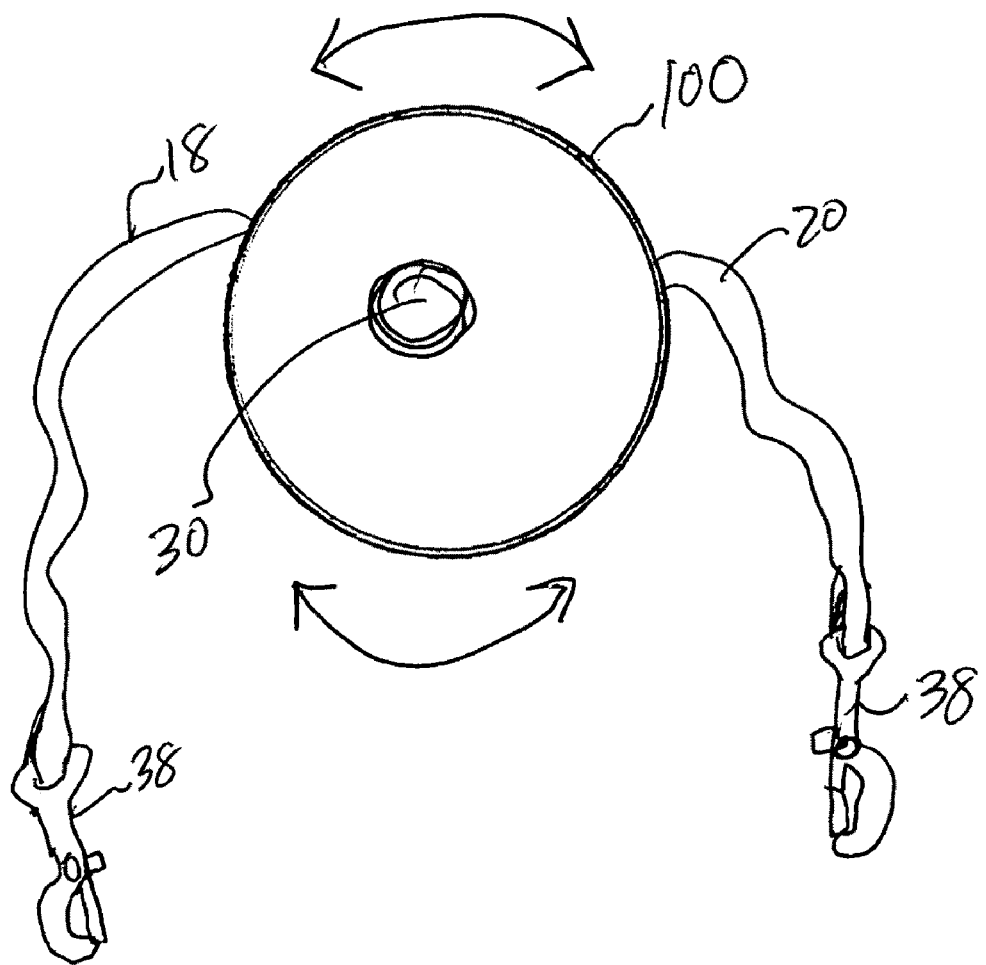
FIG. 5 is a front view of an embodiment of a leash for use with multiple pets with detangling element according to the present invention.

The bolt 14 is sized so that the main body 36 of the bolt 14 that fits within the sphere 12 has a diameter that is smaller than the openings 22, 24 or central passage 50 in the sphere 12. A longitudinal axis 34 is provided running along the length of the bolt 14 and along the axis of the sphere 12. In this arrangement, the sphere 12 is capable of rotating in either rotational direction about the longitudinal axis 34 as shown in FIG. 5, as will be explained in greater detail below.

A first pet attachment portion 18 and a second pet attachment portion 20 are provided extending from opposite sides of the sphere 12. The pet attachment portions 18, 20 are preferably portions of "pet leashes" as are known in the art, including engaging means 38 at the ends of the pet attachment portions 18, 20 for hooking on to the collars or parts of collars or harnesses of pets. Spring-operated latches 52 or other types of clips are commonly used in this regard as engaging means. The pet attachment portions 18, 20 may be of any length.

The pet attachment portions 18, 20 extend from approximately opposite sides of the sphere 12, and are positioned so as to be generally aligned with or in the vicinity of the midpoint 40 of the bolt 14. In a preferred embodiment, the pet attachment portions 18, 20 are equidistant from each other. The pet attachment portions 18, 20 extend from approximate opposite sides of the sphere 12, and may be attached or affixed to or within the sphere 12 in any suitable manner, such as by an adhesive, or by being sandwiched within the halves of the sphere 12. In addition, the sphere 12 may be provided with openings 42 for receiving a portion of each pet attachment portion 18, 20, and an inner engaging means such as a post 54 may be provided at the inner portions of each pet attachment portion 18, 20 so that each pet attachment portion 18, 20 will stay engaged to the sphere 12. Any manner of affixing the pet attachment portions 18, 20 to, on or in the sphere are acceptable, so long as the pet attachment portions 18, 20 do not easily detach from the sphere 12 and are generally secured to the sphere 12.

Figure 6:
FIG. 6 is an illustrative view of a person walking multiple pets using a leash for use with multiple pets with detangling element according to the present invention.

As shown in FIG. 6, in use, pets 44a, 44b are hooked to the ends of the pet attachment portion 18, 20, and may be taken for a walk by a pet walker 200. If the pets 44a, 44b cross paths, the pets will pull on the pet attachment portions 18, 20, which are positioned on approximately opposite sides of the freely rotatably sphere 12. Due to the fact that the sphere 12 is freely rotatable about the bolt 14, and due to the shape of the sphere 12 having a curved surface, the sphere 12 will rotate about the axis 104, thereby preventing the pet attachment portions 18, 20 from becoming tangled. The arrangement of the present invention provides a novel and unique means for preventing pets from becoming tangled when two pets are being walked simultaneously, as the rotation of the sphere 12 in response to a pet pulling its pet attachment portion 18, 20 will automatically untangle the pet attachment portions 18, 20.

The curved surface 102 of the sphere 12 or the surface or wall of any other generally ellipsoid-shaped or generally spheroid-shaped detangling element 100 provides a "slip" surface to prevent tangling. The sphere 12 may be sized with any acceptable diameter, and may be sized according to the size of the pets being attached to the leash 10. In a preferred embodiment, the sphere 12 has a diameter in the range of approximately about 2 inches to approximately about 6 inches, although smaller or larger spheres are of course acceptable, according to the needs of a user and the size of the pets.

In one embodiment, the handle portion 16 is adjacent the sphere 12, such as shown in FIGS. 1 and 2. The handle portion 16 may also be attached to the bolt 14 via a strap 60 of any desired length, as shown in FIG. 4. The handle portion 16 preferably includes an opening for receiving the fingers or at least a portion of the hand of a person using the leash 10.

Figure 7:
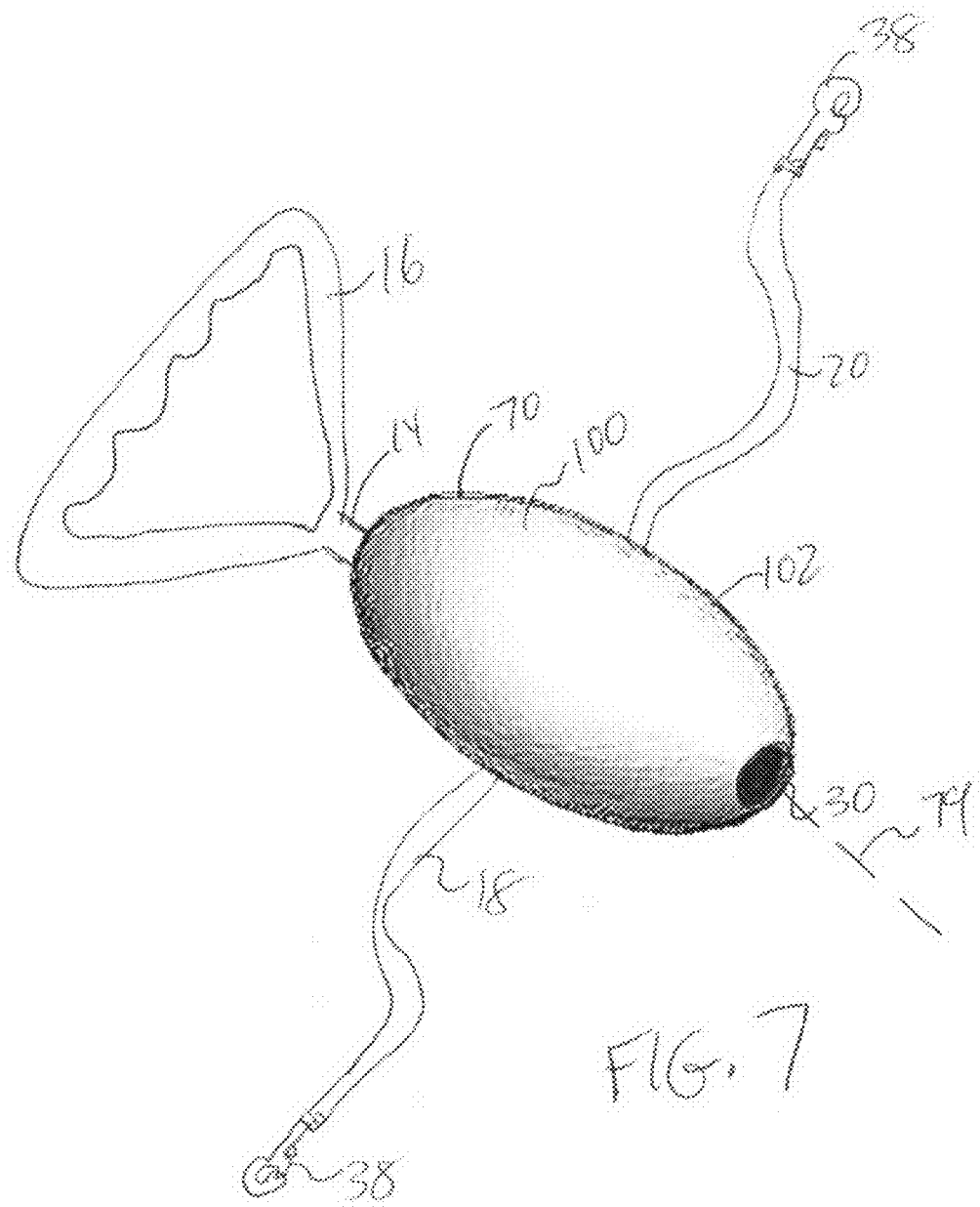
FIG. 7 is a perspective view of another embodiment of a leash for use with multiple pets with detangling element according to the present invention.

In another embodiment of the present invention shown in FIG. 7, rather than using a sphere 12, the leash detangling element 100 is an ellipsoid-shaped element 70 used as the means for preventing the pet attachment portions 18, 20 from tangling. The passage and/or bolt 14, runs along the major axis 79 of the ellipsoid-shaped element 70. As shown in FIG. 7, a leash of the present invention using an ellipsoid 70 is formed similar to the sphere 12 arrangement shown in FIGS. 1 and 2.

Figure 8:
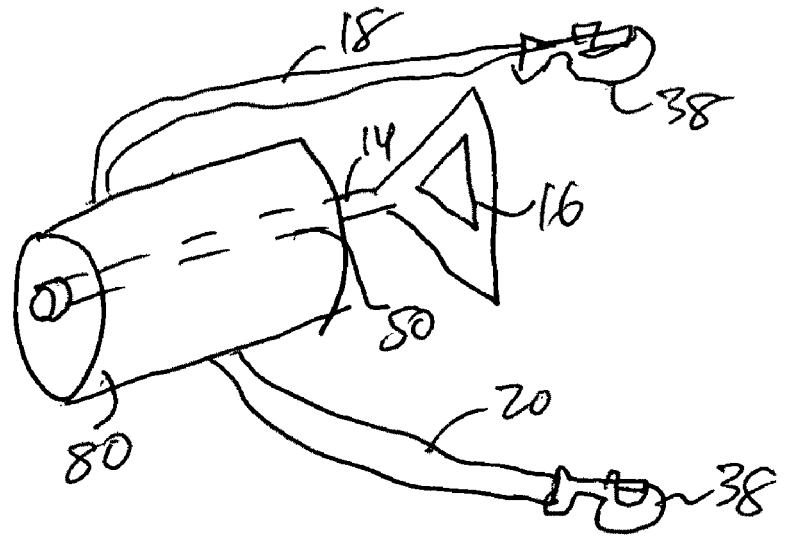
FIG. 8 is a perspective view of another embodiment of a leash for use with multiple pets with detangling element according to the present invention.

In yet another embodiment of the present invention, shown in FIG. 8 rather than using a sphere-shaped or ellipsoid-shaped element, a generally cylindrical element 80 is provided as the leash-detangling element 100. As shown in FIG. 8, a leash of the present invention using a generally cylindrical element 80 is formed similar to the sphere 12 arrangement shown in FIGS. 1 and 2.

Figure 9:
FIG. 9 is a perspective view of another embodiment of a leash for use with multiple pets with detangling element according to the present invention.

A cone-shaped or frusto-conical shaped element 89 may also be used as the detangling element 100, as shown in FIG. 9.

In another embodiment of the present invention, the leash-detangling element 100 has a diameter along its mid-point that is less than its length, as shown in FIG. 7, where the detangling element 100 is an ellipsoid shape. In one embodiment of the present invention, the leash-detangling element 100 may have a diameter along its mid-point "M" that is greater than its length "L", as shown in FIG. 10. In that case, the passage 50 and/or bolt 14 would run along the latitudinal axis 105 of the leash-detangling element 100.

It is thus believed that the operation and construction of the present invention will be apparent from the foregoing description. While the invention shown and described has been characterized as being preferred, it will be readily apparent that various changes and modifications could be made therein without departing from the scope of the invention as defined in the following claims.

What is claimed is:

1. A leash for use with multiple pets, comprising:
an ellipsoid-shaped detangling element having a curved surface, an axis and a passage along the axis;
a bolt positioned through the axis of the ellipsoid-shaped detangling element, the bolt having a handle portion extending form an end of the bolt;
a first pet attachment portion extending from the surface of the ellipsoid-shaped element; and,
a second pet attachment portion extending from the surface of the ellipsoid-shaped element, and spaced apart from the first pet attachment portion;
wherein the ellipsoid-shaped detangling element is configured to rotate about the bolt.

2. The leash for use with multiple pets according to claim 1, wherein the first pet attachment portion and the second pet attachment portion extend from approximately opposite sides of the surface of the ellipsoid-shaped element.

3. The leash for use with multiple pets according to claim 1, wherein the first pet attachment portion and the second pet attachment portion are spaced approximately equidistant from each other.

4. The leash for use with multiple pets according to claim 1, wherein the ellipsoid-shaped detangling element has a spherical shape.

5. The leash for use with multiple pets according to claim 1, wherein first pet attachment portion and the second pet attachment portion have latches at the end thereof configured to attach to a pet collar or pet harness.

6. A leash for use with multiple pets, comprising:
a detangling element having an axis and a passage running along the axis, the detangling element having a curved surface surrounding the axis;
a bolt positioned through the axis, the bolt having a handle portion extending from an end of the bolt;
a first pet attachment portion extending from the surface of the detangling element; and
a second pet attachment portion extending from the surface of the detangling element, and spaced apart from the first pet attachment portion;
wherein the detangling element is configured to rotate about the bolt; and
wherein the detangling element has a spherical shape.

7. The leash for use with multiple pets according to claim 6, wherein the first pet attachment portion and the second pet attachment portion extend from approximately opposite sides of the detangling element.

8. The leash for use with multiple pets according to claim 6, wherein the first pet attachment portion and the second pet attachment portion are spaced approximately equidistant from each other.

9. The least for use with multiple pets according to claim 6, wherein first pet attachment portion and the second pet attachment portion have latches at the end thereof configured to attach to a pet collar or pet harness.

* * * * *